(12) United States Patent
Hermann et al.

(10) Patent No.: US 7,054,341 B2
(45) Date of Patent: May 30, 2006

(54) METHODS AND SYSTEMS FOR LASER PROCESSING A WORKPIECE AND METHODS AND APPARATUS FOR CONTROLLING BEAM QUALITY THEREIN

(75) Inventors: Gerald Francis Hermann, Westland, MI (US); Thomas Robert Kugler, Williamston, MI (US); Mohammed Naeem, Rugby (GB); Keith Withnall, West Haddon (GB); Walther Goethals, Best (NL); David M. Filgas, Newbury Park, CA (US)

(73) Assignee: GSI Group Ltd., Warwickshire (GB)

( * ) Notice: Subject to any disclaimer, the term of this patent is extended or adjusted under 35 U.S.C. 154(b) by 0 days.

(21) Appl. No.: 10/505,070

(22) PCT Filed: Feb. 19, 2003

(86) PCT No.: PCT/US03/04851

§ 371 (c)(1),
(2), (4) Date: Aug. 19, 2004

(87) PCT Pub. No.: WO03/071039

PCT Pub. Date: Aug. 28, 2003

(65) Prior Publication Data

US 2005/0094684 A1    May 5, 2005

Related U.S. Application Data

(60) Provisional application No. 60/358,058, filed on Feb. 19, 2002.

(30) Foreign Application Priority Data

Mar. 1, 2002  (EP) .................................. 02251444
Mar. 1, 2002  (EP) .................................. 02251446

(51) Int. Cl.
*H01S 3/10*       (2006.01)
(52) U.S. Cl. .......................................... 372/26; 372/31
(58) Field of Classification Search .................. 272/26, 272/108; 219/121.83; 372/26
See application file for complete search history.

(56) References Cited

U.S. PATENT DOCUMENTS 3,810,044 A * 5/1974 Woodbury et al. ............ 372/33
4,105,956 A * 8/1978 Boling ........................ 372/15
4,799,755 A * 1/1989 Jones .......................... 385/38

(Continued)

OTHER PUBLICATIONS

Ready, John F., LIA Handbook of Material Processing, Chapter 2, Lasers for Materials Processing, pp. 42-44, 2001.

*Primary Examiner*—Minsun Oh Harvey
*Assistant Examiner*—Dung (Michael) T. Nguyen
(74) *Attorney, Agent, or Firm*—Brooks Kushman P.C.

(57) ABSTRACT

Laser processing methods, systems and apparatus having a super-modulating power supply (6) or pumping subsystem (5) and high beam quality (i.e., brightness) are disclosed. The methods, systems and apparatus have significant benefits, improved operation characteristics and material processing capability over currently available methods, systems and apparatus. In at least one embodiment, the beam quality of a high power solid state laser (2) is improved in the presence of thermal lensing. High power laser cutting, scribing, and welding results are improved with a combination of modulation and high beam quality while providing for improved processing speeds.

34 Claims, 6 Drawing Sheets

U.S. PATENT DOCUMENTS 5,025,446 A * 6/1991 Kuizenga ..................... 372/21
5,334,816 A * 8/1994 Sugiyama .............. 219/121.83
5,757,842 A    5/1998 LaPlante et al.
6,888,859 B1 * 5/2005 Weber et al. ................. 372/34

* cited by examiner (SPOT SIZE 0.30mm STAINLESS STEEL)

METHODS AND SYSTEMS FOR LASER PROCESSING A WORKPIECE AND METHODS AND APPARATUS FOR CONTROLLING BEAM QUALITY THEREIN

CROSS-REFERENCE TO RELATED APPLICATIONS

This application claims the benefit of U.S. Provisional Application Ser. No. 60/358,058, entitled "Method and System for Laser Welding", filed Feb. 19, 2002. This application also claims the benefit of European Patent Applications EP 02 251446.7, entitled "Laser Apparatus" filed 1 Mar. 2002 and EP 02 251444.2, entitled "Laser Apparatus", filed 1 Mar. 2002.

BACKGROUND OF THE INVENTION

1. Field of the Invention

This invention relates to methods and systems for laser processing a workpiece and methods and apparatus for controlling beam quality therein. An improved laser source has particular applicability to laser welding, cutting, scribing, and similar applications.

2. Background Art

Continuous wave lasers (CW lasers) are commonly used in material processing applications. These are typically solid state lasers and may have Nd:YAG laser rods (laser media) or other types of laser rods. They are commonly used for material processing operations, such as drilling, welding, cutting, ablation, heat treatment and so on, on both metal and non-metal target materials.

Referring to FIG. 1, a CW laser depicted therein comprises a laser resonator 1 including at least one laser rod 2 (typically an Nd:YAG element) which is mounted between two flat mirrors 3 and 4. The mirror 3 is a high reflectivity rear mirror 3 and the mirror 4 is a partially transmissive front mirror 4, known as the output coupler. The laser rod 2 is pumped by one or more pumping elements such as lamps 5, which are powered by an electrical source 6 (e.g. AC source) that generally includes a resonant circuit. Typically the source 6 is designed to produce an output of about 15 kilowatts average power and 30 kilowatts peak power.

CW lasers have a rated average power and this is shown in FIG. 2 as level "CW." This level may be, for example, 1000 watts, as shown in FIG. 2. Such a CW laser is generally modulated by altering the power supplied to one of more pumping lamps to a level up to the CW level depending upon the power required at any time during a material processing operation. As shown in FIG. 2, the level may be dynamically varied up to the CW level to control a processing operation. Alternatively, a DC power supply may be used, but such use should be carefully considered as failure rates may increase. The CW output is one that can be maintained for 100% of the time as an average level and the laser power is modulated up to this. A parameter known as "process speed" is, in many cases, determined by the output power and beam quality at any time.

It is sometimes desirable to try to achieve as fast a processing time as possible and, up to now, this has been done by using either high levels of modulation or high beam quality. High modulation is generally achieved with very high frequencies of well above 1500 Hz using effects like Q-switching, phase-locking, acousto-optic modulation and so on. These effects, which are done at high modulation frequency, are designed to produce high single peak but lower average power laser outputs. For example, a high power q-switched laser may have high peak power at repetition frequencies of a few KHz, but average power orders of magnitude less. The pulse width may be substantially less than 1 microsecond resulting in energy too low for high power processing. Conversely, at very high repetition rates the average power increases, but with an accompanying decrease in peak power, stability, and pulse energy.

The teaching of present laser technology, particularly high power CW laser technology, is to try to improve beam quality as much as possible. Beam quality is defined by the size of a spot (or a diameter of a waist in a laser beam) and is generally measured in mm-mrad. Beam quality of a laser beam is determined by the full angle divergence of the beam times the diameter of the beam at a waist position (all references herein refer to the diameter and full-angle divergence criteria). The lower the numerical value of the beam quality, the better for most applications, although there is generally a trade-off between beam quality and output power. In various CW systems, processing speeds are based on beam quality improvements. For example, excellent beam quality has been obtained in diode pumped CW systems having limited output power.

It is well known that the worst-case beam quality of a laser is inversely proportional to the effective length of the resonator, and proportional to the area of the limiting aperture inside the resonator, which is usually the rod diameter. The best beam quality (i.e., the lowest value) is therefore derived from long resonators with small radius limiting apertures. Although some resonators have single rods as shown in FIG. 1, often resonators have a plurality of rods arranged in series.

Various methods are known for controlling beam quality of high power solid state lasers having one or more rods. Several methods are described in "LIA Handbook of Material Processing" pp. 42–44, 2001. For example, in lasers with single rods, the beam quality can be varied by moving the output coupler and rear mirror either further apart or closer together to improve or degrade beam quality, respectively. However, in periodic resonators with more than one rod, this is not possible. In such cases, the pumping chambers have to move to maintain periodicity and symmetry. This is usually impractical due to water and power connections.

An alternative method of controlling beam quality is to vary the radius, and therefore area, of the limiting aperture in the resonator. In most industrial lasers, as described, the beam quality-defining aperture is the rod. The beam quality can then be controlled by using different diameter rods. Small diameter rods can be used for high beam quality and larger diameter rods for poorer beam quality.

Typically, improved beam quality is at the expense of lower output power and therefore a balance has to be made. However, a limitation of this technique is that to obtain very good beam quality, a very small diameter rod is required if the pitch of the resonator is to be limited to practical values. To obtain high power, long rods are required. Long thin rods, however, have poor stiffness and can be flexed easily by coolant flow causing instability in the laser output. Such rods, being very long and very thin, are subject to breakage when mechanically stressed in handling.

A further alternative of controlling beam quality is to place apertures midway between the rods in a periodic resonator or to place them close to the output coupler or rear mirror. It is known that waists are formed in periodic resonators, and by placing an aperture at a waist position, beam quality can be controlled. One limitation of this particular technique is that the waist diameter, and therefore aperture transmission, depends on the value of thermal lensing in the laser rods. At low pump power, and therefore low thermal lensing, the diameter of the waist is at its largest and this decreases as pump power increases.

This impacts the rise time characteristics when the laser is switched from cold (or lower power) to high power. The apertures have lower transmission until the rods reach thermal equilibrium thus limiting the rise time of the laser output to about one second, for example. Many welding and cutting processes require a laser rise time much faster than this, typically of 1 to 10 ms. This precludes the use of such 'far field' apertures. A further limitation is that such apertures have to be centered with respect to the axis of the laser rods and also have to be cooled. This adds cost and complexity to the laser design.

Hence, an improved laser apparatus for use in high power system would provide beam quality management in a manner that is less sensitive to thermal variations in a particular laser arrangement (e.g. single rod and periodic resonators). Such an improvement could be applied to pulsed and CW systems.

Another current tenent of laser technology presumes that modulating a beam at low levels would only present an advantage with low beam quality equipment (i.e. numerical values significantly greater that 100 mm mrad). It has therefore always been assumed, up to now, that either high beam quality, or modulation is required.

While present laser apparatus work reasonably well, there is always room for improvement and efficiency in terms of cost and better material processing and other uses of laser apparatus. The present invention arose in an attempt to provide an improved laser apparatus for laser processing, so that higher processing speeds may be obtained with improved workpiece processing results.

SUMMARY OF THE INVENTION

An object of the present invention is to provide improved methods and systems for laser processing a workpiece and improved methods and apparatus for controlling beam quality therein.

In carrying out the above objects and other object of the present invention, a method for laser processing a workpiece using an optically pumped solid state laser apparatus having a rated CW output power of about 100 W or more is provided. The method includes modulating an optical pump to directly generate a modulated laser output beam having peak power greater than the rated CW output power. The pump is controllable with a time varying electrical signal so as to provide average output power up to the rated CW power. The method further includes limiting at least one of diameter of the output beam and full angle beam divergence of the output beam to produce a beam quality of about 100 mm-mrad or better. The method still further includes focusing the output beam, and irradiating a surface of the workpiece, with the focused output beam to modify a physical property of the workpiece.

The rated CW output power may be up to about 4 KW.

The output beam may have a frequency less than about 1.5 KHz, or may have a frequency in a range of about 500 Hz–1.5 KHz.

The output beam may be periodic, or may be approximately a square-wave or a sine-wave.

The peak power of the output beam may be up to about 250% of the rated CW output power.

The processing may comprise cutting a non-metallic workpiece.

The workpiece may comprise a metal and, the processing may comprise scribing.

The laser apparatus may be pumped by a lamp, and the step of modulating may include applying an AC signal across the lamp.

The solid state laser apparatus may comprise a rod, and the method may further comprise transmitting a beam within a resonator through an aperture positioned within the resonator. The aperture is positioned immediately adjacent to the rod so that the beam quality is stabilized in the presence of a thermal lens effect.

The modulated laser output beam may be in the form of an envelope comprising first and second bursts of pulses within first and second envelope portions, respectively.

The step of irradiating may result in by-products which substantially shield the focused output beam, whereby power density at the workpiece is attenuated. The shielded output beam is reduced in a subsequent time interval. The method may further include preselecting at least one of a modulation frequency and a duty cycle based on a time interval corresponding to a reduction in output beam shielding.

The modulated output beam may comprise: (a) a high power time interval wherein the peak power may be greater than the rated CW power, and (b) a low power time interval wherein the peak power may be less than the peak power during the high power time interval. The step of irradiating may irradiate the workpiece during the high power time interval and when shielding is reduced, whereby workpiece processing is improved relative to operation at the rated CW power.

A diameter of the focused output beam at the workpiece may be in the range of about 0.05 mm to 1 mm.

Further in carrying out the above object and other objects of the present invention, a system for laser processing a workpiece is provided. The system has a solid state laser apparatus with a rated CW output power. The system includes a solid state resonator including at least one solid state laser medium, at least one reflector, and at least one output coupler. The system further includes a pump and a super-modulating power supply for modulating the pump so that the pump pumps the at least one solid state laser medium to generate a modulated laser output beam having peak power greater than the rated CW output power. An aperture limits at least one of a diameter of the output beam and full-angle divergence of the output beam to produce a beam quality better than about 100 mm-mrad. The system further includes an optical system to focus the output beam and irradiate the workpiece.

The laser apparatus may include at least one YAG element and a lamp for pumping the at least one YAG element, and the power supply may be an AC power supply.

The laser apparatus may include at least one YAG element and a diode array for pumping the at least one YAG element, and the power supply may include a diode-based pumping system.

The solid state laser medium may include a rod and an aperture for controlling the beam quality. The aperture is located immediately adjacent the rod.

The laser medium may include a solid state laser amplifier element and a diode array for pumping the laser amplifier element, and the power supply may include a diode-based pumping system.

Yet still further in carrying out the above object and other objects of the present invention, a method of controlling beam quality in a high power laser apparatus including a laser rod having a thermal lens characteristic and at least one of a mirror and an output coupler is provided. The method includes positioning an aperture at a location immediately adjacent the rod. The aperture has a predetermined size to control beam quality.

The method may further comprise controlling beam quality during a change in a focal length of the rod. The change may result from the thermal lens characteristic during operation of the laser apparatus.

The aperture may be provided in a tube for the laser rod.

Still further in carrying out the above objects and other objects of the present invention, a laser apparatus is provided. The laser apparatus includes a laser resonator having at least one laser rod, and a laser rod tube fitted to an end of the at least one rod. The tube may define an aperture which controls beam quality of a laser beam generated by the apparatus. The aperture may be located immediately adjacent the at least one rod.

The aperture may be defined by an inner profile of the tube.

The apparatus may include a plurality of laser rods. The aperture is closer to one of the rods than to an optically adjacent end of another rod.

A ratio of cross-sectional areas between the at least one rod and the aperture may be approximately 36/25.

The aperture may be about 3 mm from an end of the at least one rod.

Yet still further in carrying out the above object and other objects of the present invention, a laser rod is provided which has a tube connected at one end thereof. The tube is provided with an aperture immediately adjacent an end of the rod for controlling beam quality of a laser beam generated by the rod when mounted in a pumping chamber.

Yet still further in carrying out the above object and other objects of the present invention, a laser apparatus is provided including a laser rod mounted in a pumping chamber, and an aperture immediately adjacent an end of the rod for controlling beam quality of a laser beam generated by the apparatus.

The aperture may be formed by the rod, or may be formed by shaping an end of the rod.

The end of the rod may be beveled.

An internal projection may be formed in the rod to form the aperture.

A high speed method of cutting a semiconductor workpiece with a laser is provided. The workpiece has a brittle characteristic and is susceptible to cracking when cut with a high energy laser beam. The method includes generating a modulated laser output beam having a frequency in the range of about 500 Hz to 1500 Hz, a maximum peak output power of about 1600 W over a focused spot having a size of about 0.05 mm to 0.3 mm, and a beam quality about 100 mm-mrad or better over the focused spot. The method further includes irradiating a surface of the workpiece with the spot during relative motion of the workpiece and the spot whereby cutting speed and edge quality of the cut workpiece is improved and undesirable microcracking of the cut workpiece is avoided.

The laser may have a rated CW power and the maximum peak output power exceeds the rated CW power.

The workpiece may be made of a silicon material having a thickness of about 0.5 mm.

The peak output power may be in the range of about 200 W–400 W and the beam quality may be about 32 mm-mrad or better.

The cutting speed may be greater than about 2 meters/minute.

A semiconductor device may be made by the cutting method.

In a high power, solid state, laser-based processing system for welding, cutting, scribing, and the like, a workpiece, a method is provided. The method includes generating a modulated solid state laser output beam having at least one of a predetermined modulation frequency in a range of 0 to about 1.5 KHz and duty cycle. The method also includes focusing the laser output beam, and irradiating a surface of the workpiece with the focused output beam to modify a physical property of the workpiece. The step of irradiating results in by-products which substantially shield the focused output beam, whereby power density of the focused output beam at the workpiece is attenuated. The shielded beam is reduced in a subsequent time interval. The method may further include preselecting at least one of the predetermined modulation frequency and the duty cycle based on a time interval corresponding to a reduction of shielding.

The modulated output beam may comprise: (a) a high power time interval wherein the peak power is greater than a rated CW power, and (b) a low power time interval wherein the peak power is less than the peak power during the high power time interval. The step of irradiating may irradiate the workpiece during the high power time interval and when shielding is reduced, whereby workpiece processing is improved relative to operation at the rated CW power.

A solid state laser system for carrying out the above method is further provided.

The above system may include a super-modulating power supply.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 15a is an end sectional view and FIG. 15b is a sectional view along lines 15b—15b;

DETAILED DESCRIPTION OF THE PREFERRED EMBODIMENTS

Figure 3:
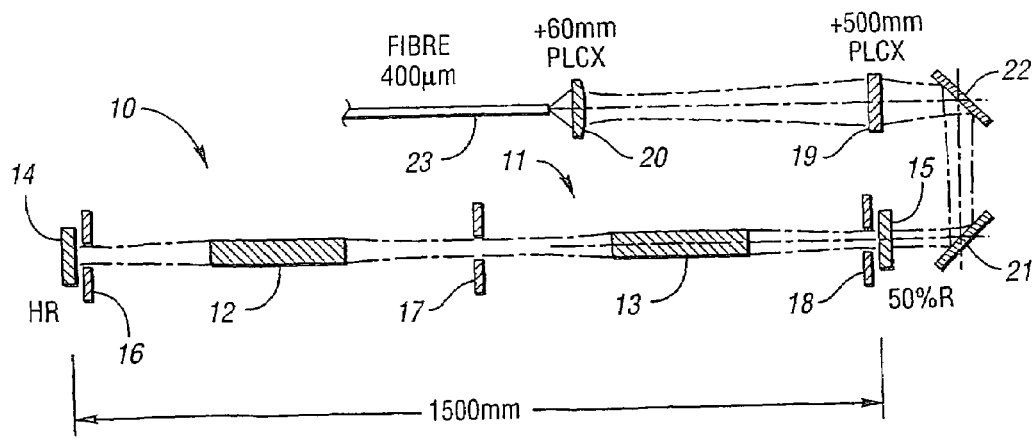
FIG. 3 is a schematic view of a laser resonator.

FIG. 3 shows a laser resonator. In one embodiment of the invention, this resonator includes two flooded ceramic cavities 10 and 11 each housing an Nd:YAG rod 12 and 13, respectively. Alternatively, two dry gold cavities may be used with the same AC power supply. Each chamber includes two arc lamps fitted with electrodes for AC excitation, typically up to 8 KW per lamp at 20–30 KHz. (e.g.: 15 KW total per chamber, 30 KW total lamp power).

Figure 1:
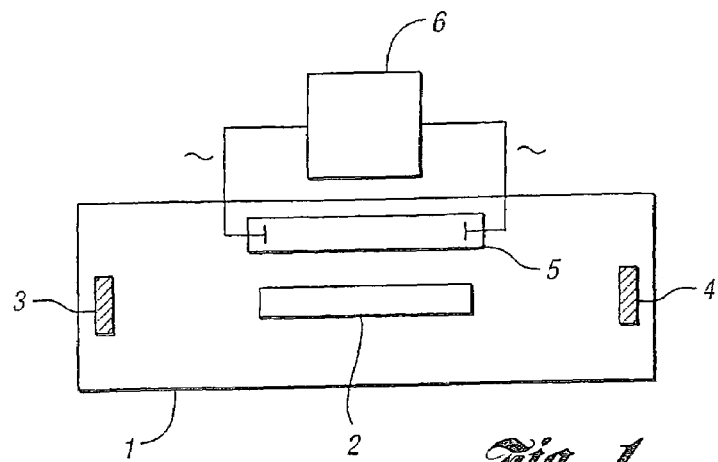
FIG. 1 is a schematic view of a laser pumping chamber.
Figure 2:
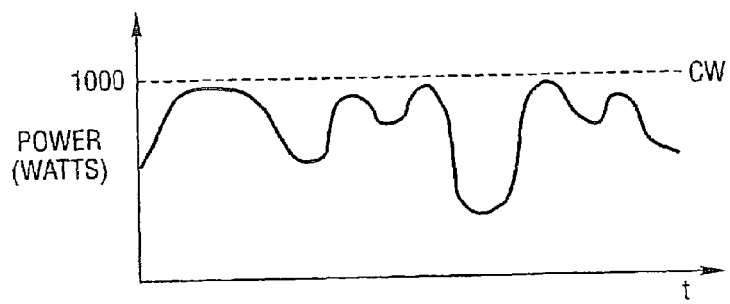
FIG. 2 is a graph of power versus time which shows power output of a conventional CW laser when modulated up to the CW level.

FIG. 1, by way of example, depicts a single arc lamp 5 and an AC source 6. The resonator of FIG. 3 is formed between two flat mirrors 14 and 15 which are spaced 1500 mm apart to give a resonator pitch of 750 mm. The cavities 10 and 11 are arranged to give a symmetrical periodic resonator controlled by three apertures 16, 17 and 18 each having a 3.3 mm diameter placed at the center point and close to the mirrors 14 and 15.

The resonator output is imaged down by approximately nine times using 500 mm and 60 mm focal length lenses 19 and 20, respectively, after passing beam turning mirrors 21 and 22 and launched into a 400 mm core diameter fiber 23 of approximately 5 M in length.

Although not shown in FIG. 3, a beam produced from the apparatus is collimated by a 160 mm achromat and focused using a 100 mm achromat, with a compensating meniscus lens, in a cutting head, to give a spot size of 0.27 mm. In other versions of the apparatus, a 200 mm achromat recollimating lens was refocused by a 80 mm triplet lens to give a spot size of 0.16 mm.

The laser as described is used to generate 750 W of power at the source for a drive level of 30 KW, with a beam quality of approximately 70–80 mm-mrad (diameter×full-angle). The laser was tested using a power supply allowing sine and square wave modulation at enhanced peak power (i.e. peak power greater than the CW level).

Figure 4:
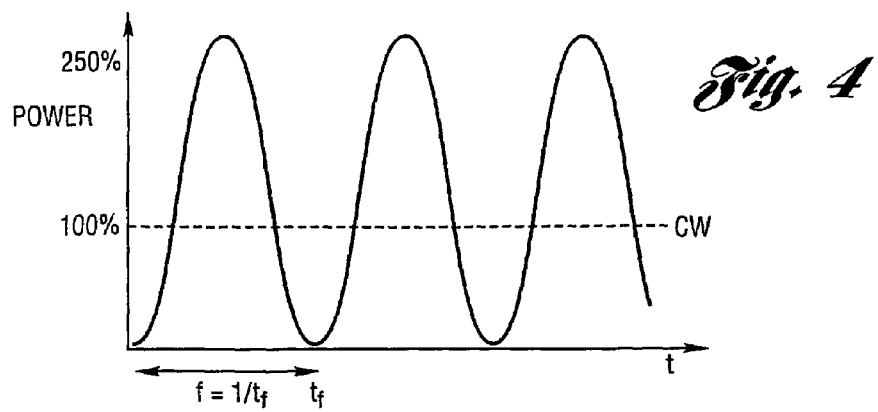
FIG. 4 is a graph of power versus time which shows a sine wave, super modulated output.
Figure 5:
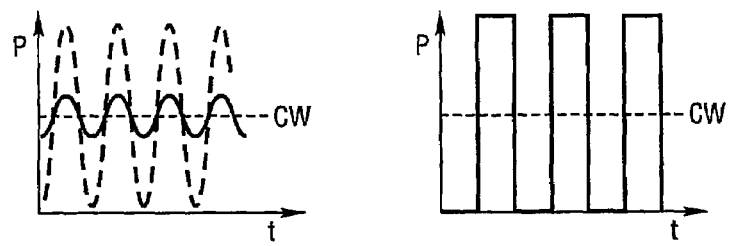
FIG. 5 is a graph of power versus time which shows a sine wave, modulated output of different modulation depth.
Figure 6:
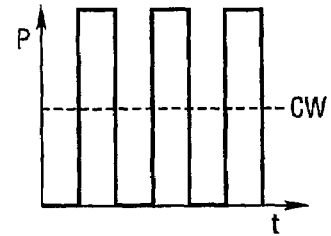
FIG. 6 is a graph of power versus time which shows a square wave modulated output.

As shown in FIG. 4, a super modulation process may be used in some embodiments of the invention to enable the modulated beam to be increased, either periodically or non-periodically, above the CW level. In FIG. 4, super modulation in the form of a sine wave is shown which can modulate the beam, in this case periodically, to power of up to 250% or so of the CW level. Methods of achieving modulation are, in themselves, well known. The depth and frequency, f, of modulation may be varied and, as shown in FIG. 5, may be varied from a large depth of modulation to, as shown in FIG. 4, a relatively small depth of modulation about the CW level. FIG. 6 shows an alternative type of modulation in which square wave modulation is used and, in preferred embodiments, modulation levels up to about 250% of CW level have been used.

However, it should be noted that, in other embodiments of the invention, the output can be sine wave, square wave, or any other wave form (e.g. sawtooth wave), which may be periodic or non-periodic.

The modulation frequency of some embodiments of the invention is preferably between 0 Hz and 1500 Hz. In this example, a high beam quality of about 70 to 80 mm-mrad in combination with super modulation can provide the laser with peak output powers of up to about 2 KW at 100 Hz modulation frequency, and this falls to about 1700 W at 1440 Hz square wave modulation.

The super-modulated laser apparatus of some embodiments of the invention is controllable over a wide frequency range, preferably from DC to the maximum frequency of interest. Further, unlike conventional pulsed lasers, the super-modulated design provides for nearly flat, or at least slowly varying available mean output power over the entire frequency range of operation (e.g: 0–1.5 KHz). Hence, one preferred super-modulated laser apparatus with controllable AC excitation of the present invention provides capability for operation and testing with a wide variety of waveforms, including but not limited to sine-waves, square wave, ramps, and burst operation.

However, it is to be recognized that alternative pulsed laser arrangements may be used to practice certain processing methods and laser processing applications, for instance, cutting, welding, and scribing applications later described herein. As such, the invention should not be considered as restricted to the preferred high power laser apparatus.

Beam Quality in High Power Lasers

Beam quality can be selected by adjustment of resonator length and use of beam-diameter apertures, as is well known, since beam quality is proportional to the area of a limiting aperture, and inversely proportional to effective length of a resonator, as is known. Other methods of adjusting beam quality are known to those skilled in the art as discussed earlier.

Beam quality of about 70–80 mm-mrad was produced with the arrangement of FIG. 3, but further improvements were desirable.

Figure 7:
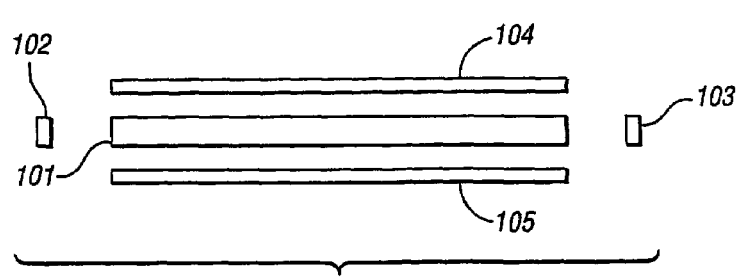
FIG. 7 is a schematic view of laser resonator.

Referring now to FIG. 7, a laser rod, which in a solid state laser is often a Nd:YAG laser rod 101, is mounted in a resonator between two mirrors 102 and 103 in conventional fashion. One of the mirrors 102 and 103 is half silvered so that the laser beam can be emitted from that end. Lasing is stimulated by a pumping mechanism, which is usually in the form of pumping lamps 104 and 105. The apparatus described immediately above is mounted within a housing (not shown), which keeps the components in a predetermined relationship with respect to each other.

Figure 8:
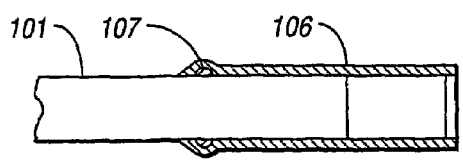
FIG. 8 is a view, partially broken away and in cross section, of a laser rod with attached laser rod tube.

As previously described, laser rod tubes are often fitted to each end of a laser rod. FIG. 8 shows a laser rod tube 106 fitted to the laser rod 101. One or more seals 107, typically of Teflon™ or similar material, may be used in affixing the tube 106 to the rod 101 to avoid ingress of cooling water and to create a good seal. The tube 106 is then used to mount the rod 101 in the pumping chamber and to provide a means of water sealing, as is described in the applicant's co-pending patent application No. GB 0130971.1. In embodiments of the present invention, this rod tube 106 is used to provide an aperture for controlling beam quality and which overcomes the problems of prior art devices for controlling beam quality associated with centering, cooling and laser rise time.

In at least one embodiment of a super-modulated laser system of the present invention, an aperture may be placed close to the rod 101.

Figure 9:
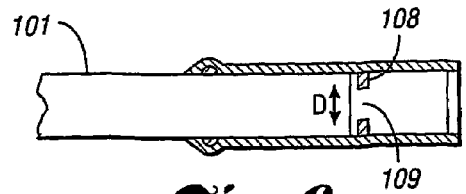
FIG. 9 is a view, partially broken away and in cross section, of a laser rod with laser rod tube forming an aperture.

Referring now to FIG. 9, an aperture 109 of diameter significantly smaller than the diameter of rod aperture 108 is machined into the inner profile of a rod tube. This aperture 109 controls the beam quality of the laser. The aperture 109 may typically be positioned so that, in use, it is positioned about 3 mm from the end of the rod 101 but this may be varied. Usually, the aperture 109 will not be mounted right against the rod 101 but in certain circumstances it could be.

A typical laser rod has a diameter of approximately 6.35 or 6.00 mm. The diameter D of the aperture is selected to have a selected beam quality. For a high beam quality, in one embodiment, the aperture is of diameter 4.83 mm. Thus, the ratio of cross-sectional areas is approximately 36/25.

As previously described, the beam quality of a laser beam is determined by the divergence of the beam times the diameter of the beam at a waist position. The diameter of the waist depends upon the thermal lensing of the system and, for a given system thermal lensing, is determined by pump power. At low pump power, thermal lensing is low and the diameter of the waist is at its largest. As pump power increases, lensing increases and so the waist diameter decreases.

Figure 10A:
FIGS. 10a–10c are side schematic views of laser resonators of different characteristics.

FIG. 10a shows low pumping power, where there is accordingly little thermal lensing. Laser energy indicated by phantom lines 110 within the resonator therefore lies Within a generally parallel envelope and does not significantly converge or diverge from the line of the rod 101 to the mirrors 102 and 103. It will therefore be apparent that if an aperture 108a (shown in dashed lines in FIGS. 10b and 10c) is placed anywhere between an end 109 of the rod 101 and the mirror 102 (or mirror 103) then the aperture 108a will limit the diameter of the beam and will therefore directly affect beam quality.

Figure 10B:
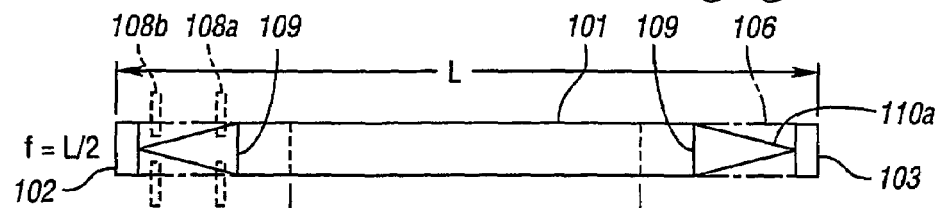

FIG. 10b shows the position in which the pumping power has been increased to thereby increase thermal lensing up to the confocal point of the resonator, where the focal length f of the rod is equal to the effective length of the resonator L/2, i.e. f=L/2. This is known as a confocal resonator. As is described, when the laser is switched from cold (low power) to high power the waist diameter of such a system decreases from the diameter generally shown at 108b in FIG. 10b to the diameter shown as 110a in FIG. 10b. Thus, an aperture placed at position 108a falls within the envelope of a beam within the resonator both at the turn on stage and subsequently, since it is within both envelopes 108a and 108b and so the aperture controls beam quality from start up. However, if an aperture is placed nearer to a mirror 102 or 103 or output coupler than to the end 109 of the rod 101, as shown at position 108b, for example, or, alternatively, if placed closer to an adjacent resonator n in a multiple resonator set up, then the aperture will affect beam quality not at lower powers but at higher powers, as the beam converges, will not affect it since the beam envelope will then lie wholly within the aperture within the area defined by the aperture.

Figure 10C:
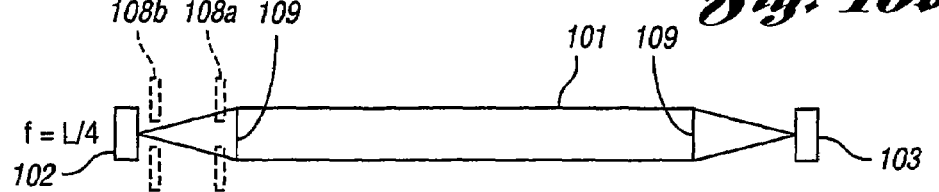

With increased beam power, a situation such as that shown in FIG. 10c results. In this example, the focal length, f, is equal to L/4. As such powers, an aperture closer to the end 109 of the rod 101 than to a mirror 102 or 103 (or an adjacent rod) is effective at controlling beam quality whereas one nearer to the mirror 102 or 103 is not since the beam envelope falls wholly within the aperture and therefore is not affected by it.

In some embodiments, the aperture lies within 0 to 5 mms, typically 3 mm, of the end 109 of the rod 101. In embodiments of the invention, the aperture may lie closer to the rod 101 than to an adjacent mirror 102 or 103 or the end of an adjacent rod.

Figure 11:
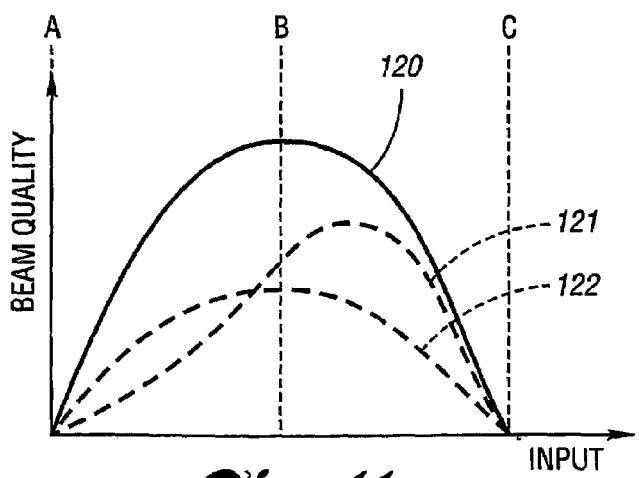
FIG. 11 is a graph of power input versus beam quality.

FIG. 11 shows schematically a plot of power input against beam quality. A plot 120 is for a system in which no aperture is provided. Plot 121 is for a system where an aperture is provided near the mirror 102 or 103, i.e., in a position such as 108b in FIGS. 10b and 10c. A plot 122 is for a position where an aperture is provided near the rod 101 (apertures 108a). The plots 120, 121 and 122 show how beam quality varies as the input increases, passing the situation shown in FIGS. 10a, 10b and 10c at positions A, B and C, respectively, in FIG. 11. The beam quality plot 120 for a non-apertured system is in the format as shown at B of maximum beam quality for a particular input power. Where an aperture is provided near to the mirror 102 or 103 (position 108b) then beam quality is initially good. However, it deteriorates as input increases as the effects of the aperture reduce, as described above. With the aperture controlling beam quality, plot 122, the overall plot is again Gaussian generally but is lower magnitude (i.e. better beam quality) than the non-apertured configuration.

A balance is required between beam quality and between laser output since laser output generally will initially increase with increased input but then begins to decrease.

Figure 12:
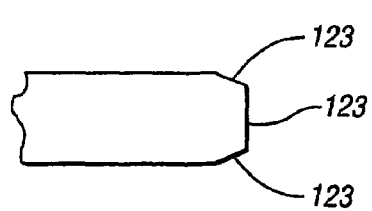
FIG. 12 is a view, partially broken away, of an alternative embodiment of the present invention.

In alternative embodiments, the aperture may be provided by the rod 101 itself, rather than being provided by a laser rod tube or other external means. FIG. 12 shows an embodiment in which the end of a rod is beveled 123 to create an aperture. It may be otherwise shaped to create a suitable aperture.

Figure 13:
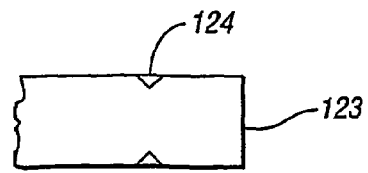
FIG. 13 is a view, partially broken away, of a further alternative embodiment of the present invention.

FIG. 13 shows an alternative version in which a notch 124 or other means is formed in a rod 123, which provides an aperture defining the width of the beam at that point.

In embodiments of the invention, the aperture is automatically centered on the rod axis by mechanical tolerances, particularly if the aperture is formed in the inner profile of the rod tube or otherwise associated with the rod tube and therefore problems of centering are reduced or eliminated. Furthermore, the laser rod is generally water-cooled and the aperture itself is cooled by the water flow cooling the laser rod. In addition, since the aperture is placed close to the end of the laser rod, the transmission of the aperture is insensitive to laser pump power/rod thermal lensing as described and therefore does not limit the laser rise time as an aperture placed close to a mirror might.

It is to be recognized that the beam quality improvement obtained is not restricted in its application to preferred super-modulated systems but may be utilized in numerous solid state laser systems where the beam quality is affect by thermal lensing. For example, the improvement may be used with high power, diode pumped, CW lasers.

Additional Alternatives with Super-Modulation and High Beam Quality

In at least one embodiment a commercially available JK-Model laser produced by the assignee may be used for laser processing in accordance with the present invention. Specific JK models have rated average output powers of 200, 400, 500, 800, and 1000 W. The 800 W and 1000 W versions, the JK models 802 and 1002 respectively, also include a periodic resonator arrangement with two rods in series (similar to FIG. 3). The models incorporate the preferred super-modulation approach and enhanced beam quality with placement of an aperture close to the output of the rod(s). These models may be used to produce a high power laser beam so as to cut, weld, or otherwise modify a workpiece. Preferably the laser will be fiber coupled to a remote head which in turn will be manipulated by a robot, for instance.

Figure 15B:
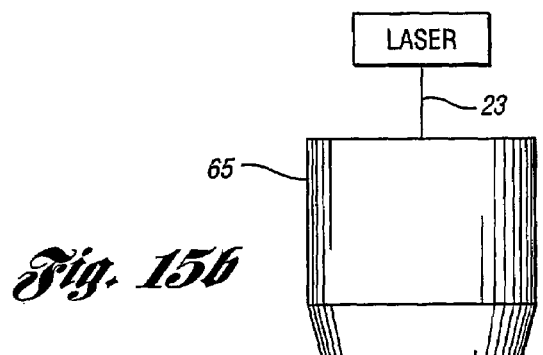
FIGS. 15a and 15b are sectional schematic views which show a laser head used for a scribing operation.

By way of example, FIG. 15b schematically shows a laser coupled by an optical fiber 23 to a cutting head 65 for a laser scribing operation (to be discussed later). Further details of exemplary robotic laser heads and applications can be found in patent publication WO 0054925 and U.S. Pat. No. 5,428,280.

Exemplary Laser Applications

Laser Cutting

Trials have been carried out using the laser described in FIG. 3, using both conventional CW and also super modulated beams, at power levels up to 700 W and with 0.16 mm and 0.27 mm spot sizes. Cutting was performed with air assist at 4 bar pressure. Best results were obtained with the modulated beam at maximum repetition rate (1440 Hz, 640 W average power and 1610 W peak power). In another embodiment, exemplary parameters included a frequency in the range of about 500–1500 Hz, approximate 200 W average power and 400 W peak powers, with about 32 mm-mrad, beam quality over a focused spot diameter in a range of about 0.08–0.3 mm.

Figure 14A:
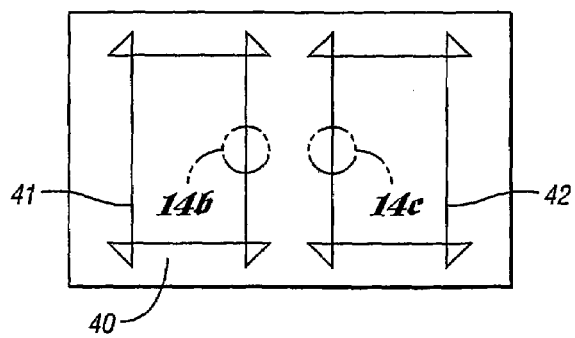
FIGS. 14a–14c are top schematic views (FIGS. 14b and 14c being enlarged) which illustrate improvements in the cutting of silicon using a method and system of the invention.
Figure 14B:
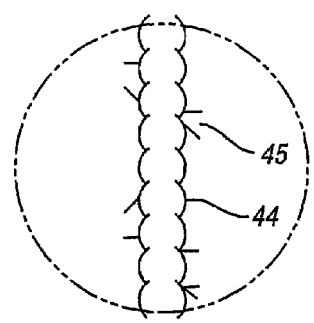
Figure 14C:
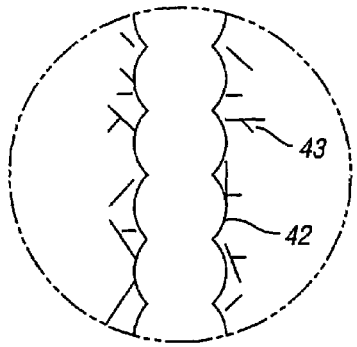

Referring now to FIGS. 14a–14c, the apparatus was used for cutting polycrystalline silicon material, which is conventionally manufactured for solar cells. Substrate 40 is an example. The material was about 0.5 mm thick. This material is generally extremely brittle and prone to cracking during laser cutting. It is generally cut with conventional lasers at speeds of around 1.5 M/minute. A path 42 shows a typical, conventional cutting path, whereas a path 41 is a path made with a cutting head using an embodiment of the present invention. Edge quality with conventional laser processing is generally acceptable but micro-cracking 43 is often produced and this can lead to failure of some components during subsequent process steps and reduction in yield. When a conventional laser apparatus with poorer beam quality was used with a conventional pulsed beam, then poor edge quality 42 and unacceptable cracking 43 were found. However, using a modulated scheme of the present invention, cutting speeds of up 14 M/minute were achieved and a significant improvement in edge quality 44 and reduction in cracking 45 were noted.

Other advantages of modulation include better cutting quality and speed and other advantages such as reduction of uncontrolled burning whilst retaining process speed and stability, improvement in off-normal cutting. Cutting at an angle to the surface and cutting around a bend in two or more axes where the speed of the motion device can be high but the speed of the laser focus on the surface of the part can be slow can result in overburn of the cut or an intermittent cut. The material to be cut can be overheated by the slower speed in the bend and/or the increased relative thickness of the material to be cut. This can result in extra burning of the base metal or a cut that does not completely penetrate. Extra burning will create a very large kerf width that can be more than 20 times the kerf width that can cause a scrap part. Super modulation at the same mean power or at a lower mean power can cut through the relatively thicker material without the high mean powers that can cause overburning.

Also, at lower mean power but maintaining the peak power will result in a more consistent cut around a corner without overburn. Better cutting of many materials, for example, galvanized steels and many other materials including aluminum alloys, is achieved. In addition, modulation is particularly beneficial for piercing materials. If a slug is to be cut out of a material then the normal way this is done is by first piercing the material and then making a closed cut which causes the slug to drop. The use of modulation and thereby higher peak power improves the piercing and improves the cutting process. Smaller, high aspect ratio, piercing holes may be made using modulation in combination with high beam quality.

Preferably, a method and system of the invention having beam quality better than about 100 mm-mrad (full angle measurement) is used (that is, numerical values less than or equal to about this) together with the use of super modulation, i.e. modulation in which the beam is, whether periodically or non-periodically, modulated above the CW level. This leads to lasers of lower average power but high peak power. Typically, modulation frequencies between 0 Hz and 1500 Hz may be used, with varying duty cycle.

Laser Scribing

Figure 15A:
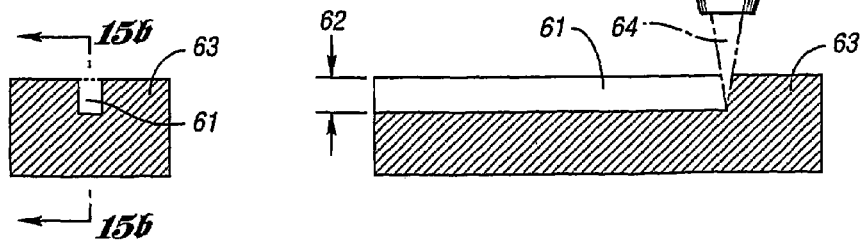

Another application where super modulation creates improvements over CW and pulsed lasers is in scribing components. A scribe is a kerf cut into a material that does not penetrate through to the back side. Other terms such as a blind cut or blind slot could also be used. FIGS. 15a–15b show a standard scribe process where a laser beam 64 coming from a focusing assembly 65 that might also incorporate a coaxial gas nozzle delivers the laser beam onto the workpiece or target part 63 creating a scribe 61 to a depth 62.

Metal and non-metal parts are scribed for several reasons. For example, the scribe could be a chip-breaking initiator in a subsequent machining process, marking, blind kerf cutting for subsequent part detachment as in cutting nearly through a weld, and for blind slot cutting where the feature is required in the part. CW lasers produce a more uncontrolled burn, especially at the bottom of the scribe that can become a large circular well at the bottom of the scribe. CW lasers do not have the extra scribe depth capability of a supermodulated laser. CW lasers run the risk of explosive oxygen overburn with some materials and the debris being removed can interfere with the incoming laser beam or clog the scribe for inconsistent scribe depth with more debris in or near the scribe. Pulsed lasers with high peak powers can scribe somewhat deeper than a supermodulated laser. However, their relatively slow pulsing rate and lower average power at high pulsing frequencies reduce their scribing speed and/or depth at high speed compared to a supermodulated laser.

Pulsing or using a super modulated laser can benefit the laser scribe process in several ways. It improves the coupling of the laser energy into the material. It increases the amount of controlled burning and vaporization/expulsion of material and can make a deeper scribe. It increases the effective depth of focus for deeper and more consistent scribes, and the "off time" allows time for the spatter to be ejected improving depth and quality. Super modulation at high frequencies allows faster scribing and/or deeper scribing at high speeds.

Laser Welding

Figure 16:
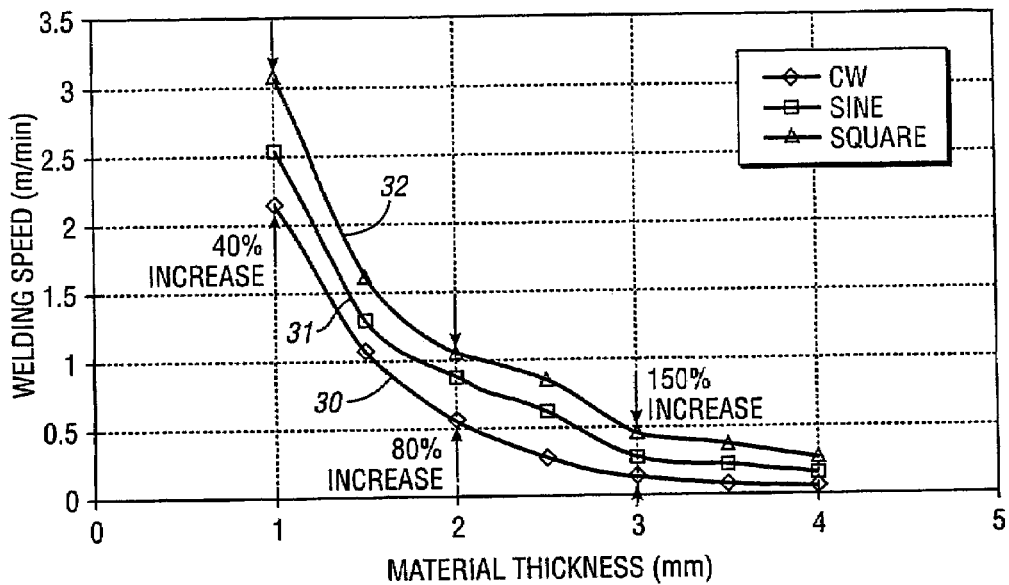
FIG. 16 is a graph of welding speed versus material thickness for various types of modulation.

The plots 30–32 of FIG. 16 show an example of how welding speed improves for a laser of high beam quality and modulation, as opposed to CW operation. In the figure, three sets of data of the plots 30, 31 and 32 are provided, each showing how welding speed varies with material thickness for a particular type of modulation. The first plot 30 shows the situation when CW is used. Plot 30 shows welding speed (in meters per minute) against material thickness in millimeters, for a CW output. Plot 31 shows this for a sine wave output, and plot 32 shows this for a square wave super modulated output. The material to be welded was 304 stainless steel. It is seen that at a material thickness of 1 mm, there is a 40% increase in speed between the CW and square wave performance. At 3 mm, the increase is very substantial, about 150%.

Figure 17:
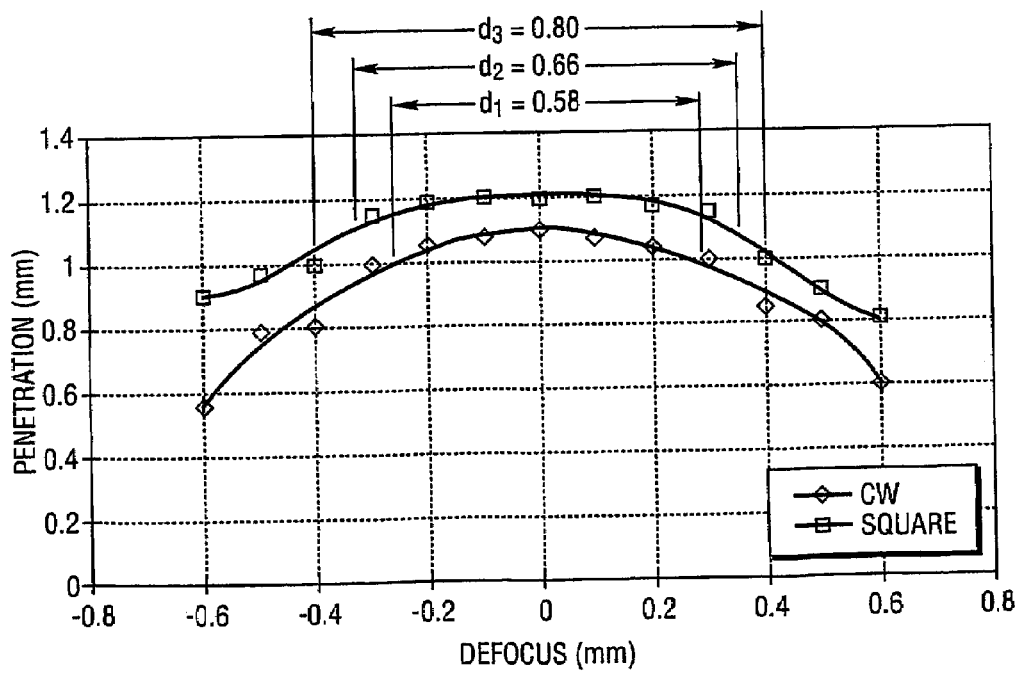
FIG. 17 is a graph of beam penetration versus defocus for various modulation types.

The plots of FIG. 17 shows the effect of processing depth of focus (e.g.: as used herein refers to the depth range over which acceptable machining occurs without changing the relative position of the workpiece and beam focal point) compared between CW and square wave modulation. The CW output of the laser was 470 W and for a square wave modulated output, at a modulation frequency of 180 Hz, the average power was 350 W and peak power of 700 W. The spot size is 0.30 mm and the work piece is stainless steel. It is seen that a significant improvement is made between the CW and square wave outputs.

As FIG. 17 shows, the depth of focus with square-wave modulation is improved. In the example shown, it is about 0.66 mm ($d_2$) whereas that for CW is about 0.58 mm ($d_1$). Additionally, the depth of focus for the same penetration ($d_3$) (i.e. where the plots for CW and for square-wave achieve the same penetration) is improved from 0.58 to about 0.80, i.e. about 138%.

Approximately 10% more penetration is achieved using the 350 W modulated output rather than the 480 W CW one. Since the average power is less, this is more economical and, in practice, uses about 16% less electricity to create the same weld. This can lead to significant advantages such as significantly longer lamp life (typically 25% longer). Also, the depth of focus is improved by nearly 40% for the same weld penetration.

Thus, by using high peak power modulation, a laser of lower average power can weld to a greater penetration than a similar CW unit but with a reduced heat input. As a practical example of this, when welding a component such a fuel injector where high heat input can distort very fine parts, welding with a sine-wave output produces the same penetration as CW output but with no distortion. Furthermore, high peak power improves the processing of reflective materials and materials with high heat conductivity, such as aluminum alloys.

Unlike CO2 lasers, Nd:YAG laser light is not absorbed in the weld plume by a reverse-bremsstrahlung mechanism. Using helium assist gas to cool the weld, plume can minimize the absorption with CO2 lasers. Tests have shown that using a high heat conductivity helium shield gas does not improve the weld nugget profile as it does with CO2 lasers so the mechanism appears to be different. The scattering of the YAG laser light is more prevalent due to its shorter wavelength and the scattering of the laser light due to soot and other small particles in the weld plume could explain the widening weld nugget and loss of penetration seen with CW output as compared to super modulated.

Figure 18A:
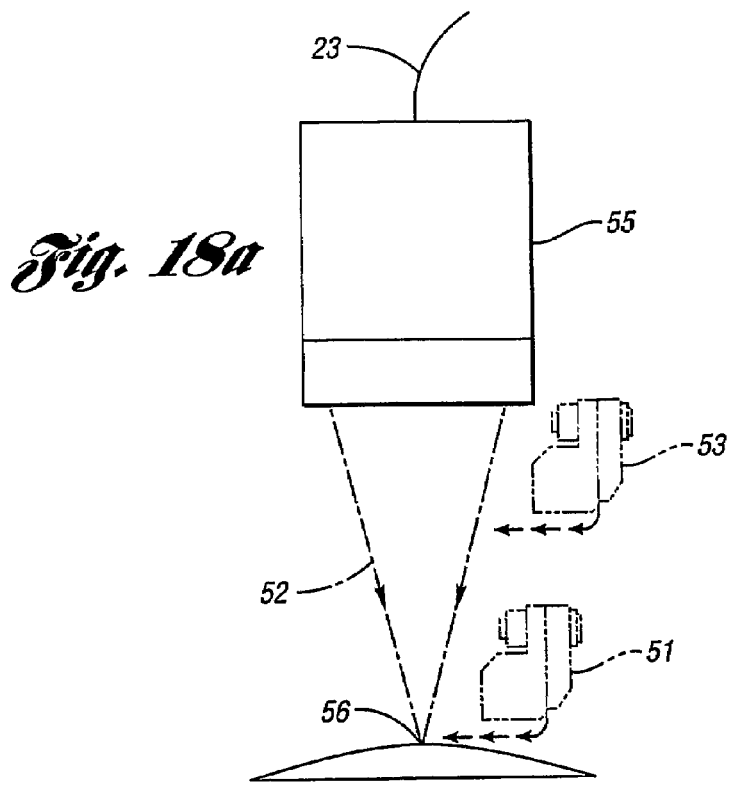
FIGS. 18a–18b are a schematic view of a system of the present invention and a graph of weld penetration versus air knife height, respectively, which show welding results obtained with CW and sine wave modulated beams at different air knife positions relative to the workpiece.

FIG. 18a shows a laser welding head 55 with an air knife at variable positions 51 and 53 above a weld area 56. Using an air knife at the close position 51 pushes the weld plume and soot away from the incoming laser beam 52 and results in significantly more penetration with CW output than without an air knife or with the air knife located at the position 53 further above the weld plume.

Figure 18B:
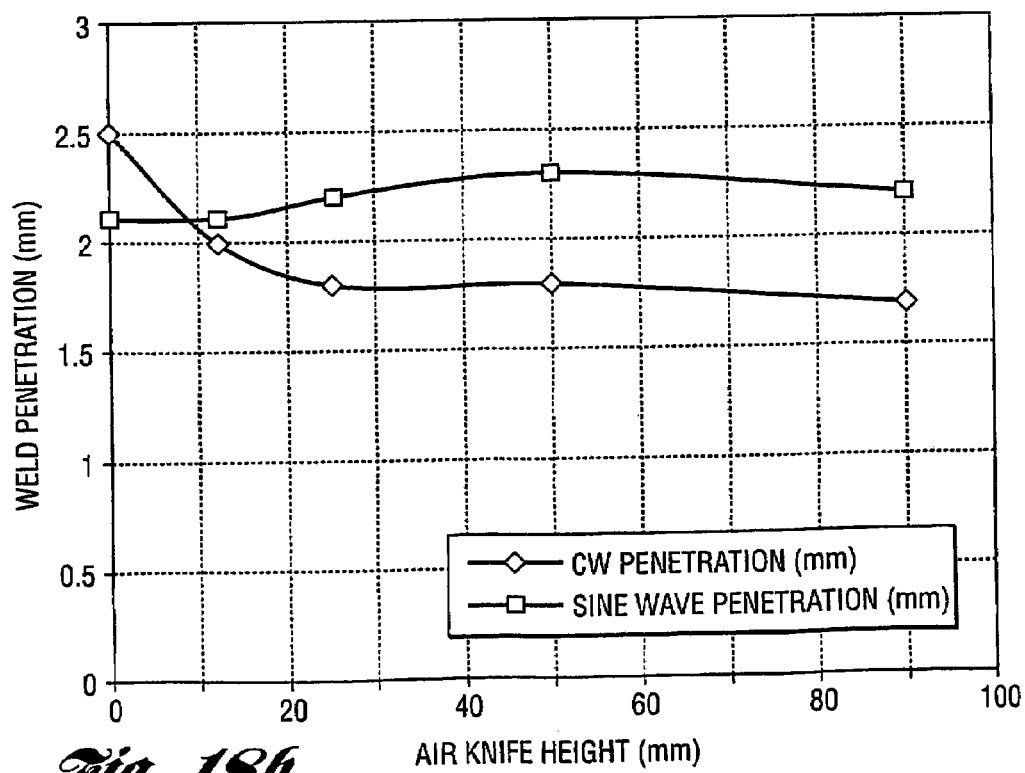

When super modulation was used the penetration remained nearly constant for any air knife position above the weld area 56. The plots of FIG. 18b shows this result. The plots demonstrate that the soot cloud above the weld takes some time to form and to reach a concentration that significantly scatters the laser beam. If modulation is used to allow some time for the particulate cloud to dissipate during the low power cycle, then the next high power cycle in the modulated output will not be scattered to produce better welding.

Some materials appear to create more scattering soot than others and appear to have a maximum modulation frequency limit above which insufficient soot dissipation occurs and weld penetration is significantly reduced and weld width can increase. Some materials benefit from modulation frequencies of no more than about 300 Hz and others appear to benefit at frequencies above about 1 kHz.

Penetration level could also play a role in the maximum frequency. Use of high speed cross-flow air knives is not beneficial in many welding applications since it makes shielding of the weld area with inert gas difficult and costly due to the volume flow rate of gas and entrainment of oxygen from the air from high speed turbulent flow. Also, a great deal more of the costly inert gas is required as well as the gas flow's tendency to push and froth the molten weld metal creating a rough weld surface, undercutting, and porosity, etc.

Summary of Some General Aspects

Accordingly, lower average power lasers using the modulation techniques of the present invention process thicker materials faster than a CW laser of possibly higher average power.

Note that in the embodiments, the modulation depth and duty cycle can be altered.

The present invention includes any modulation technique that modulates, either periodically or not, a beam above the CW level. The modulation may be by use of power supply techniques, i.e. simply increasing the power supplied to a pumping lamp above that of a level which reduces the CW output or by pumping methods or by other means. Methods of modulating laser outputs are, in themselves, known, as are methods of improving beam quality.

The invention is applicable to any solid state laser and most preferably to Nd:YAG lasers.

The invention is generally applicable to lasers having a beam quality better than 100 mm-mrad.

The beam quality may be improved by placing an aperture closer to the rod than to a mirror or output coupler. Alternatively, the rod may be shaped to create a suitable aperture as described herein.

Parameters such as angle of cut and quality of cut are significantly improved using the present invention. High quality welding results may be obtained by controlling the frequency and duty cycle of modulation.

A laser based method of processing a workpiece using an optically pumped solid state laser apparatus generally comprises: (1) generating a modulated laser output beam having a modulation frequency and beam quality less than about 100 mm-mrad, the beam quality defined by the product of beam diameter-full angle; and (2) irradiating the workpiece with the laser output beam.

While the best mode for carrying out the invention has been described in detail, those familiar with the art to which this invention relates will recognize various alternative designs and embodiments for practicing the invention. For instance, though the lamp pumped solid state laser system and AC driver are regarded as preferred for carrying out the invention, a diode pumped system may be modulated above the average power level to weld, cut, or otherwise modify the workpiece with the pulse parameters disclosed herein.

Similarly, one or more optical amplifiers having the desired peak power, pulse width, and pulse temporal spacing may be used for certain workpiece processing applications.

Where suitable, other solid state laser elements such as a fiber or waveguide device may replace the Nd:YAG rod. It is therefore contemplated that the following claims shall cover any such modifications or variations of the described embodiments as falling within the scope of the invention.

What is claimed is:

1. A method for laser processing a workpiece using an optically pumped solid state laser apparatus having a rated CW output power of about 100 W or more, the method comprising:
    modulating an optical pump to directly generate a modulated laser output beam having peak power greater than the rated CW output power, the pump being controllable with a time varying electrical signal so as to provide average output power up to the rated CW power;
    limiting at least one of diameter of the output beam and full angle beam divergence of the output beam to produce a beam quality of about 100 mm-mrad or better;
    focusing the output beam; and
    irradiating a surface of the workpiece with the focused output beam to modify a physical property of the workpiece.

2. The method as claimed in claim 1, wherein the rated CW output power is up to about 4 KW.

3. The method as claimed in claim 1, wherein the output beam has a frequency less than about 1.5 KHz.

4. The method as claimed in claim 1, wherein the output beam has a frequency in a range of about 500 Hz–1.5 KHz.

5. The method as claimed in claim 1, wherein the output beam is periodic.

6. The method as claimed in claim 1, wherein the output beam is approximately a square-wave or a sine-wave.

7. The method as claimed in claim 1, wherein the peak power of the output beam is up to about 250% of the rated CW output power.

8. The method as claimed in claim 1, wherein the processing comprises cutting a non-metallic workpiece.

9. The method as claimed in claim 1, wherein the workpiece comprises a metal and wherein the processing comprises scribing.

10. The method as claimed in claim 1, wherein the laser apparatus is pumped by a lamp, and wherein the step of modulating includes applying an AC signal across the lamp.

11. The method as claimed in claim 1, wherein the solid state laser apparatus comprises a rod, and wherein the method further comprises transmitting a beam within a resonator through an aperture positioned within the resonator, the aperture being positioned immediately adjacent to the rod so that the beam quality is stabilized in the presence of a thermal lens effect.

12. The method as claimed in claim 1, wherein the modulated laser output beam is in the form of an envelope comprising first and second bursts of pulses within first and second envelope portions, respectively.

13. The method as claimed in claim 1, wherein the step of irradiating results in by-products which substantially shield the focused output beam, whereby power density at the workpiece is attenuated, the shielded output beam being reduced in a subsequent time interval, the method further comprising:
    preselecting at least one of a modulation frequency and a duty cycle based on a time interval corresponding to a reduction in output beam shielding.

14. The method as claimed in claim 13, wherein the modulated output beam comprises: (a) a high power time interval wherein the peak power is greater than the rated CW power, and (b) a low power time interval wherein the peak power is less than the peak power during the high power time interval, wherein the step of irradiating irradiates the workpiece during the high power time interval and when shielding is reduced, whereby workpiece processing is improved relative to operation at the rated CW power.

15. The method as claimed in claim 1, wherein a diameter of the focused output beam at the workpiece is in the range of about 0.05 mm to 1 mm.

16. A system for laser processing a workpiece, the system having a solid state laser apparatus with a rated CW output power, the system comprising:
    a solid state resonator comprising at least one solid state laser medium, at least one reflector, and at least one output coupler;
    a pump and a super-modulating power supply for modulating the pump so that the pump pumps the at least one solid state laser medium to generate a modulated laser output beam having peak power greater than the rated CW output power;
    an aperture for limiting at least one of a diameter of the output beam and full-angle divergence of the output beam to produce a beam quality better than about 100 mm-mrad; and
    an optical system to focus the output beam and irradiate the workpiece.

17. The system of claim 16, wherein the laser apparatus comprises at least one YAG element and a lamp for pumping the at least one YAG element, and wherein the power supply is an AC power supply.

18. The system of claim 16, wherein the laser apparatus comprises at least one YAG element and a diode array for pumping the at least one YAG element, and wherein the power supply comprises a diode-based pumping system.

19. The system of claim 16 wherein the solid state laser medium comprises a rod and an aperture for controlling the beam quality, the aperture being located immediately adjacent the rod.

20. The system of claim 16, wherein the laser medium comprises a solid state laser amplifier element and a diode array for pumping the laser amplifier element and wherein the power supply comprises a diode-based pumping system.

21. A laser apparatus comprising:
    a laser resonator including at least one laser rod; and
    a laser rod tube fitted to an end of the at least one rod wherein the tube defines an aperture which controls beam quality of a laser beam generated by the apparatus and wherein the aperture is located immediately adjacent the at least one rod wherein a ratio of cross-sectional areas between the at least one rod and the aperture is approximately 36/25.

22. A laser apparatus comprising:
    a laser resonator including at least one laser rod; and
    a laser rod tube fitted to an end of the at least one rod wherein the tube defines an aperture which controls beam quality of a laser beam generated by the apparatus and wherein the aperture is located immediately adjacent the at least one rod wherein the aperture is about 3 mm from an end of the at least one rod.

23. A high speed method of cutting a semiconductor workpiece with a laser, the workpiece having a brittle characteristic and being susceptible to cracking when cut with a high energy laser beam, the method comprising:
    generating a modulated laser output beam having a frequency in the range of about 500 Hz to 1500 Hz, a maximum peak output power of about 1600 W over a focused spot having a size of about 0.05 mm to 0.3 mm, and a beam quality about 100 mm-mrad or better over the focused spot; and irradiating a surface of the workpiece with the spot during relative motion of the workpiece and the spot whereby cutting speed and edge quality of the cut workpiece is improved and undesirable microcracking of the cut workpiece is avoided.

24. The method of claim 23 wherein the laser has a rated CW power and the maximum peak output power exceeds the rated CW power.

25. The method of claim 23 wherein the workpiece is made of a silicon material having a thickness of about 0.5 mm.

26. The method of claim 23 wherein the peak output power is in the range of about 200 W–400 W and the beam quality is about 32 mm-mrad or better.

27. The method of claim 23 wherein the cutting speed is greater than about 2 meters/minute.

28. A semiconductor device made by the cutting method of claim 23.

29. In a high power, solid state, laser-based processing system for welding, cutting, scribing, and the like, a workpiece, the method comprising:

generating a modulated solid state laser output beam having at least one of a predetermined modulation frequency in a range of θ about 1 to about 1.5 KHz and duty cycle;

focusing the laser output beam;

irradiating a surface of the workpiece with the focused output beam to modify a physical property of the workpiece, wherein the step of irradiating results in by-products which substantially shield the focused output beam, whereby power density of the focused output beam at the workpiece is attenuated, wherein the shielded beam is reduced in a subsequent time interval and wherein the method further comprises preselecting at least one of the predetermined modulation frequency and the duty cycle based on a time interval corresponding to a reduction of shielding.

30. The method of claim 29 wherein the modulated output beam comprises: (a) a high power time interval wherein the peak power is greater than a rated CW power, and (b) a low power time interval wherein the peak power is less than the peak power during the high power time interval, and wherein the step of irradiating irradiates the workpiece during the high power time interval and when shielding is reduced, whereby workpiece processing is improved relative to operation at the rated CW power.

31. A solid state laser system for carrying out the method of claim 23.

32. The system of claim 31 wherein the system includes a super-modulating power supply.

33. A solid state laser system for carrying out the method of claim 29.

34. The system of claim 33 wherein the system includes a super-modulating power supply.

* * * * *